UNITED STATES PATENT OFFICE.

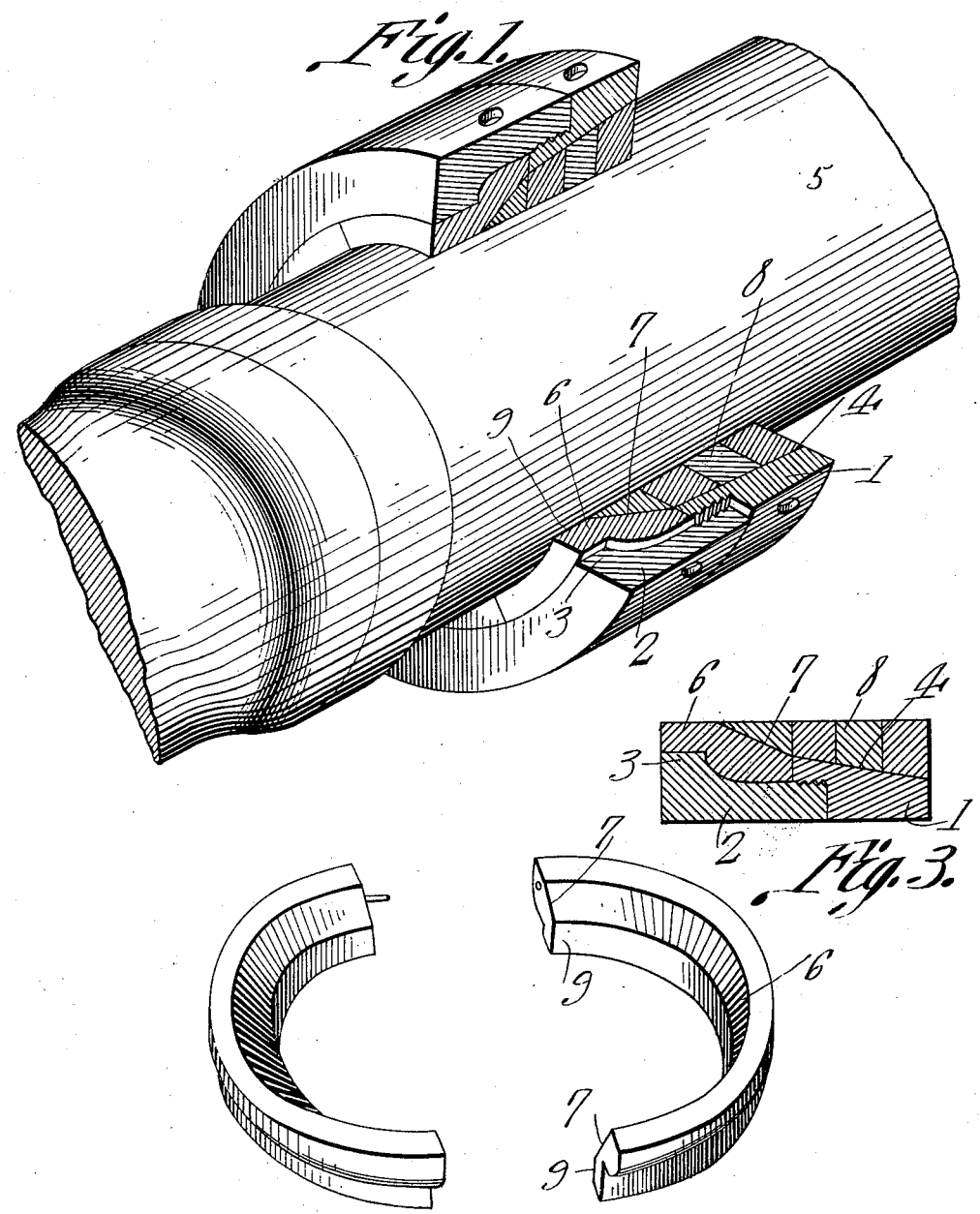

WALTER E. SNYDER, OF WEST PITTSTON, PENNSYLVANIA.

VIBRATING CUP.

1,000,700.  Specification of Letters Patent.  Patented Aug. 15, 1911.

Application filed February 28, 1911. Serial No. 611,372.

*To all whom it may concern:*

Be it known that I, WALTER E. SNYDER, a citizen of the United States, residing at West Pittston, in the county of Luzerne and State of Pennsylvania, have invented a new and useful Vibrating Cup, of which the following is a specification.

This invention has relation to vibrating cups adapted to be used for holding piston rod packings and it consists in the novel construction and arrangement of its parts as hereinafter shown and described.

The object of the invention is to provide a vibrating cup composed of sections adapted to screw-thread in engagement with each other and which hold between them bushing sections which have rod bearing surfaces and extend through to the end of the cup and have surfaces against which the ball joint of the piston packing may rest. The cup is of that type generally known as multiangular in that in the assemblage of the parts it is provided with two surfaces one at an acute angle to the axis of the piston rod upon which the cup is located and the other at an obtuse angle to the axis of the said rod. The said surface which is at an acute angle is located upon one of the sections of the cup, while the surface which is at an obtuse angle is located upon the bushing sections. By providing a cup constructed as indicated, the bushing sections may be readily renewed when worn without discarding the sections of the cup and consequently a cup having properly adjusted and fitting bushings may be maintained upon the piston rod at small cost.

In the accompanying drawings,—Figure 1 is a perspective view of a portion of a piston rod with the vibrating cup located thereon. Fig. 2 is a perspective view of the bushing sections used in the cup. Fig. 3 is a transverse sectional view of a portion of the cup.

The cup consists of sections 1 and 2 which are screw-threaded into engagement with each other, the section 2 having at one end an inwardly disposed annular flange 3 and the section 1 having an inner surface 4 which is disposed at an acute angle to the axis of the rod 5 upon which the cup is mounted.

Bushing sections 6 are located within the cup sections 2 and are seated upon the inwardly disposed flange 3 thereof. The sections 6 are provided with surfaces 7 which are inclined at obtuse angles to the axis of the rod 5 and bushing sections 6 extend through the cup section 1 and have their ends flush with the end of the said cup section whereby bearings for a ball joint (not shown) is provided.

Packing rings 8 are received within the cup section 1 and bushing sections 6 in the usual manner and bear against the side of the rod 5 and prevent the escape of steam as is usual in piston rod packings.

By providing a sectional bushing it will be seen that when the bushing has become worn the sections thereof may be removed from between the sections 1 and 2 of the cup and new bushing sections may be substituted, while the original cup may be employed for an indefinite length of time.

In addition to providing bearing surfaces for the ball joint, the bushing sections 6 also have bearing surfaces 9 which rest against the sides of the rod and these bearing surfaces 9 are sufficiently extensive to prevent undue wear and thus extend the life of the bushing sections.

Having described the invention what I claim as new and desire to secure by Letters Patent is:—

1. A vibrating cup comprising sections having a screw-threaded engagement with each other, one of which is provided with an internal flange, bushing sections seated above said flange, and having end portions flush with the ends of one of the first-mentioned sections, the first-mentioned sections securing the said bushing section in place.

2. A vibrating cup comprising sections having a screw-threaded engagement with each other, one of which is provided with an internal flange, the other section having a surface disposed at an acute angle to the axis of the cup, bushing sections seated upon the flange and secured between the first-mentioned sections, said bushing sections having rod bearing surfaces and surfaces disposed at acute angles to the axis of the cup.

3. A vibrating cup comprising sections detachably engaging each other, one of which is provided with an internal flange, bushing sections seated upon said flange and having end portions flush with the end of one of the first mentioned sections, the first mentioned section securing the said bushing sections in place.

4. A vibrating cup comprising sections detachably engaging each other, one of which is provided with an internal flange, the other section having a surface disposed at an acute angle to the axis of the cup, bushing sections seated upon the flange and secured between the first mentioned sections, said bushing sections having rod bearing surfaces and surfaces disposed at obtuse angles to the axis of the cup.

In testimony that I claim the foregoing as my own, I have hereto affixed my signature in the presence of two witnesses.

WALTER E. SNYDER.

Witnesses:
 JOHN M. ARMSTRONG,
 ROSINA E. RICHARDS.

Copies of this patent may be obtained for five cents each, by addressing the "Commissioner of Patents, Washington, D. C."